United States Patent
Dusa et al.

(10) Patent No.: US 10,041,434 B2
(45) Date of Patent: Aug. 7, 2018

(54) FUEL INJECTION OPERATION

(71) Applicant: Ford Global Technologies, LLC, Dearborn, MI (US)

(72) Inventors: Daniel Dusa, West Bloomfield, MI (US); Paul Hollar, Belleville, MI (US); Joseph Lyle Thomas, Kimball, MI (US); Ethan D. Sanborn, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 27 days.

(21) Appl. No.: 15/260,215

(22) Filed: Sep. 8, 2016

(65) Prior Publication Data

US 2018/0066598 A1   Mar. 8, 2018

(51) Int. Cl.
| | |
|---|---|
| *F02D 41/30* | (2006.01) |
| *F02D 41/06* | (2006.01) |
| *F02D 41/38* | (2006.01) |
| *F02M 55/02* | (2006.01) |

(52) U.S. Cl.
CPC ....... *F02D 41/3094* (2013.01); *F02D 41/064* (2013.01); *F02D 41/065* (2013.01); *F02D 41/3809* (2013.01); *F02M 55/025* (2013.01); *F02D 2200/021* (2013.01)

(58) Field of Classification Search
CPC .. F02D 41/064; F02D 41/065; F02D 41/3094; F02D 41/3809; F02M 55/025
USPC ................ 123/295–299, 491; 701/102–105
See application file for complete search history.

(56) References Cited

U.S. PATENT DOCUMENTS

| | | | |
|---|---|---|---|
| 9,631,572 B2 * | 4/2017 | Glugla | F02D 35/028 |
| 2006/0180121 A1 * | 8/2006 | Wickman | F02D 19/081 |
| | | | 123/299 |
| 2007/0119421 A1 * | 5/2007 | Lewis | F01N 11/002 |
| | | | 123/431 |
| 2007/0215110 A1 * | 9/2007 | Stein | F02D 19/0628 |
| | | | 123/431 |
| 2009/0282810 A1 * | 11/2009 | Leone | F02D 19/081 |
| | | | 60/285 |
| 2009/0308367 A1 * | 12/2009 | Glugla | F02D 19/081 |
| | | | 123/575 |
| 2014/0230793 A1 * | 8/2014 | Mashiki | F02D 41/3094 |
| | | | 123/478 |
| 2014/0297159 A1 | 10/2014 | Surnilla et al. | |
| 2014/0297162 A1 * | 10/2014 | Surnilla | F02D 41/3094 |
| | | | 701/104 |
| 2015/0122218 A1 * | 5/2015 | Wakao | F02D 41/008 |
| | | | 123/304 |
| 2015/0204266 A1 * | 7/2015 | Mashiki | F02D 41/3094 |
| | | | 701/103 |
| 2015/0369162 A1 * | 12/2015 | Cohn | F02D 13/0215 |
| | | | 123/406.27 |

* cited by examiner

*Primary Examiner* — John Kwon
*Assistant Examiner* — Johnny H Hoang
(74) *Attorney, Agent, or Firm* — Julia Voutyras; McCoy Russell LLP

(57) ABSTRACT

A method of operating an engine with multi-fuel injector per cylinder capabilities to accommodate reaching minimum fuel pulsewidth conditions of any of the injectors under various operating conditions including hot and cold engine starts. The method reduces engine performance and emissions variations resulting from changes in fuel injection mass below minimum mass.

20 Claims, 7 Drawing Sheets

FUEL INJECTION OPERATION

FIELD

The present description relates generally to methods and systems for controlling a multi-injector per cylinder system coupled to an internal combustion engine.

BACKGROUND AND SUMMARY

Engines may be configured with various fuel systems for delivering a desired amount of fuel to a combustion chamber. Example fuel systems may include port fuel injectors for delivering fuel into an intake port upstream of a combustion chamber, and direct fuel injectors for delivering fuel directly into the combustion chamber. Still other engines may be configured with a multi-fuel injection system that includes, for example, each of a port fuel injector and a direct fuel injector for each engine cylinder.

One example approach for utilizing both port and direct injection during engine starting includes utilizing a port injection and split direct injection, such as described by Surnilla et al. in 20140297159, for example. Therein, split fuel injection is applied during start and cranking so that fuel of lower alcohol content is port injected and fuel of higher alcohol content is direct injected as one or multiple injections.

However, the inventors herein have recognized potential issues with such an approach. For example, as operating conditions change, the desired relative amounts of the port to direct injection ratio change as well as the ratio of the multiple direct injections. Such variations can be difficult to predict under all operating conditions, particularly when an operator may or may not intervene during the start with pedal adjustments. As a result, one or more of the injections may reach a minimum pulse-width limit of the injector, unexpectedly causing an undesired enrichment. And even when such situations can be detected, it can be difficult to properly schedule adjustments to compensate with the least amount of disturbance to vehicle operation and emissions.

In one example, the issues described above may be addressed by a method, comprising: during a cold engine start, injecting, during a single cylinder cycle, a port fuel injection, an intake stroke direct fuel injection, and a compression stroke direct fuel injection; and responsive to one of the direct injections reaching a minimum direct injection pulsewidth, reducing a ratio of port to direct fuel injection.

In this way, it is possible to appropriately control not only the ratio of port to direct fuel injection, but also the ratio of the split direct injections. For example, if multiple of the direct injections reach the minimum direct injection pulsewidth, the method can reduce the ratio of port to direct fuel injection while adjusting a ratio of direct injections to bring an amount of each of the direct injections closer to each other and while maintaining an overall fuel injection amount for the cycle. This can maintain the effectiveness of the split direct injections on engine starting performance. In contrast, if only one of the direct injections reaches the minimum direct injection pulsewidth, the method may reduce the ratio of port to direct fuel injection while maintaining a ratio of direct injections relative to one another, and while maintaining an overall fuel injection amount for the cycle. In this way, the longer the ratio of direct injections can be maintained relative to one another, the better the engine emissions can be managed during the transition, given that the unadjusted ratios may have been determined to provide the optimum emissions and fuel economy balance. Such operation can be particularly relevant when the port fuel injector is coupled to a high pressure port fuel injection rail that is pressurized at least partially via the high pressure fuel pump used also for pressurizing the direct injection fuel rail, although it is still relevant to lower pressure port injection rails pressurized only via a low pressure electric-motor driven lift pump.

A technical effect of controlling the port to direct injection ratio and/or direct injection split ratio may be to enable control of engine emissions and stable engine operation even if varying conditions unexpectedly cause one of the fuel injections to reach a minimum allowable pulsewidth.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically depicts an example embodiment of a cylinder of an internal combustion engine.

FIG. 2 schematically depicts an example embodiment of a fuel system coupled to an engine having dual fuel injection capabilities.

DETAILED DESCRIPTION

The present description relates to systems and methods for operating port and direct fuel injectors within an engine system configured with a multi-fuel injector system, such as a dual injection system of only one port and one direct injector per cylinder.

Figure 1:
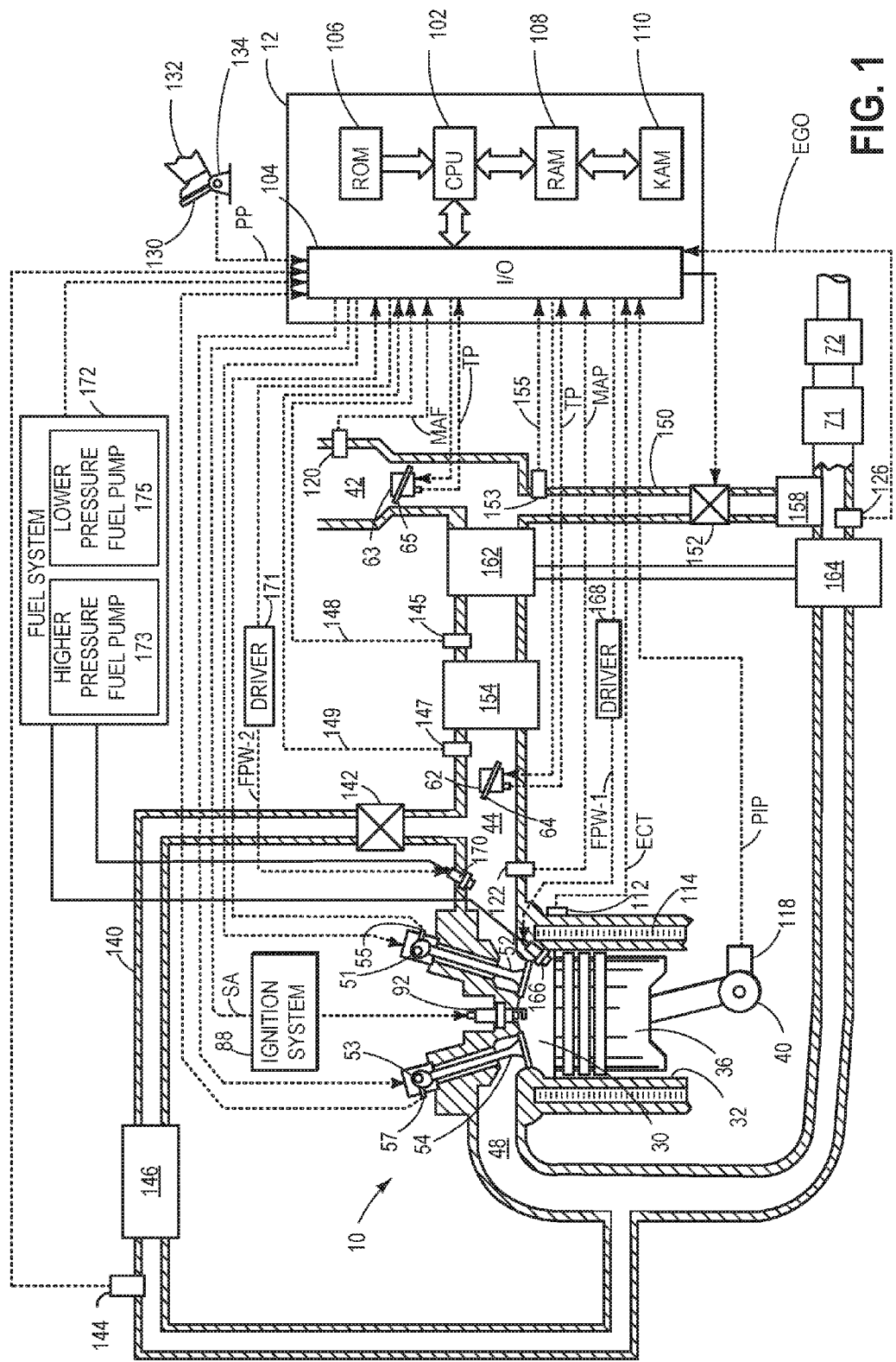
Figure 2:
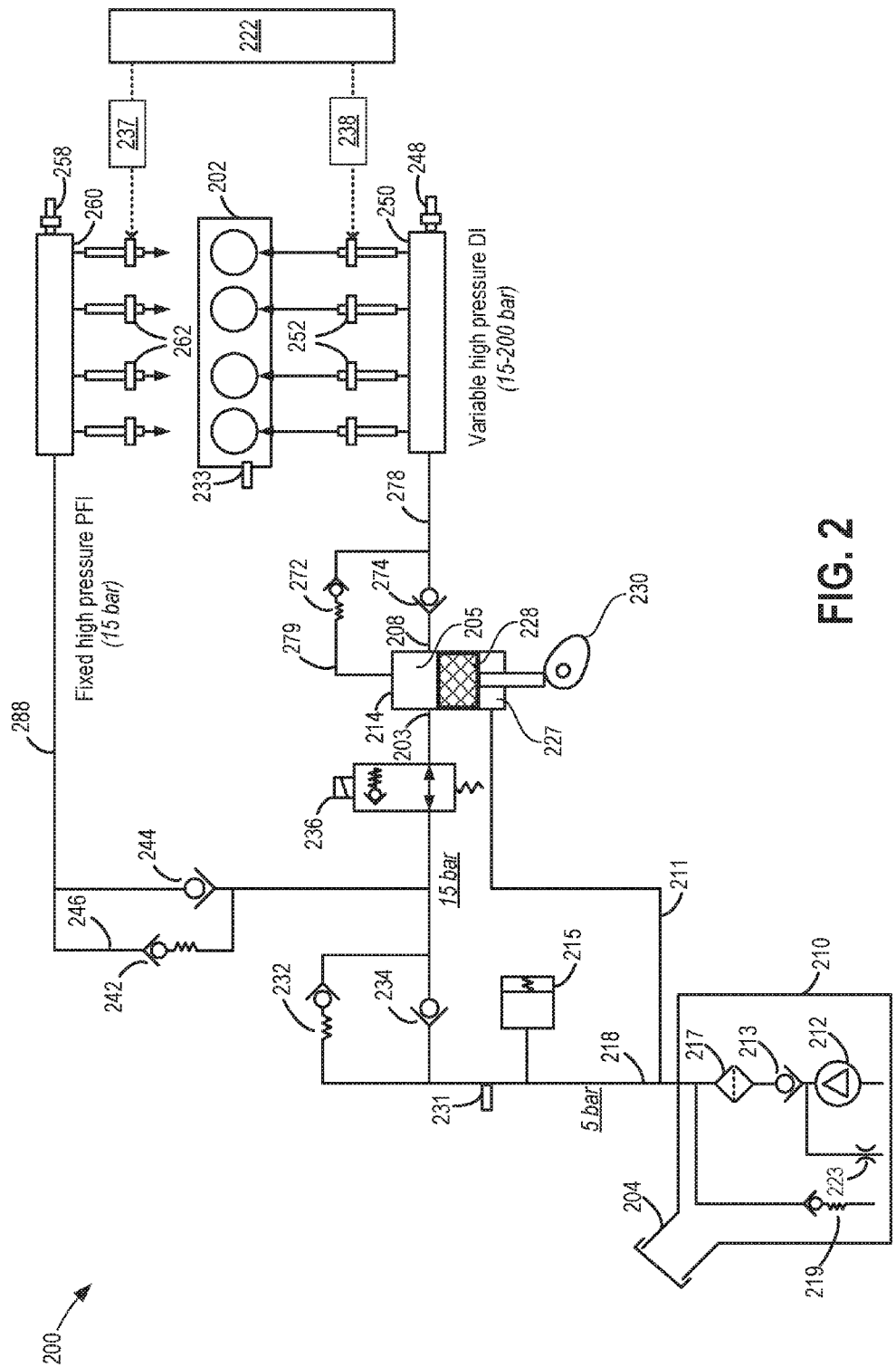
Figure 3:
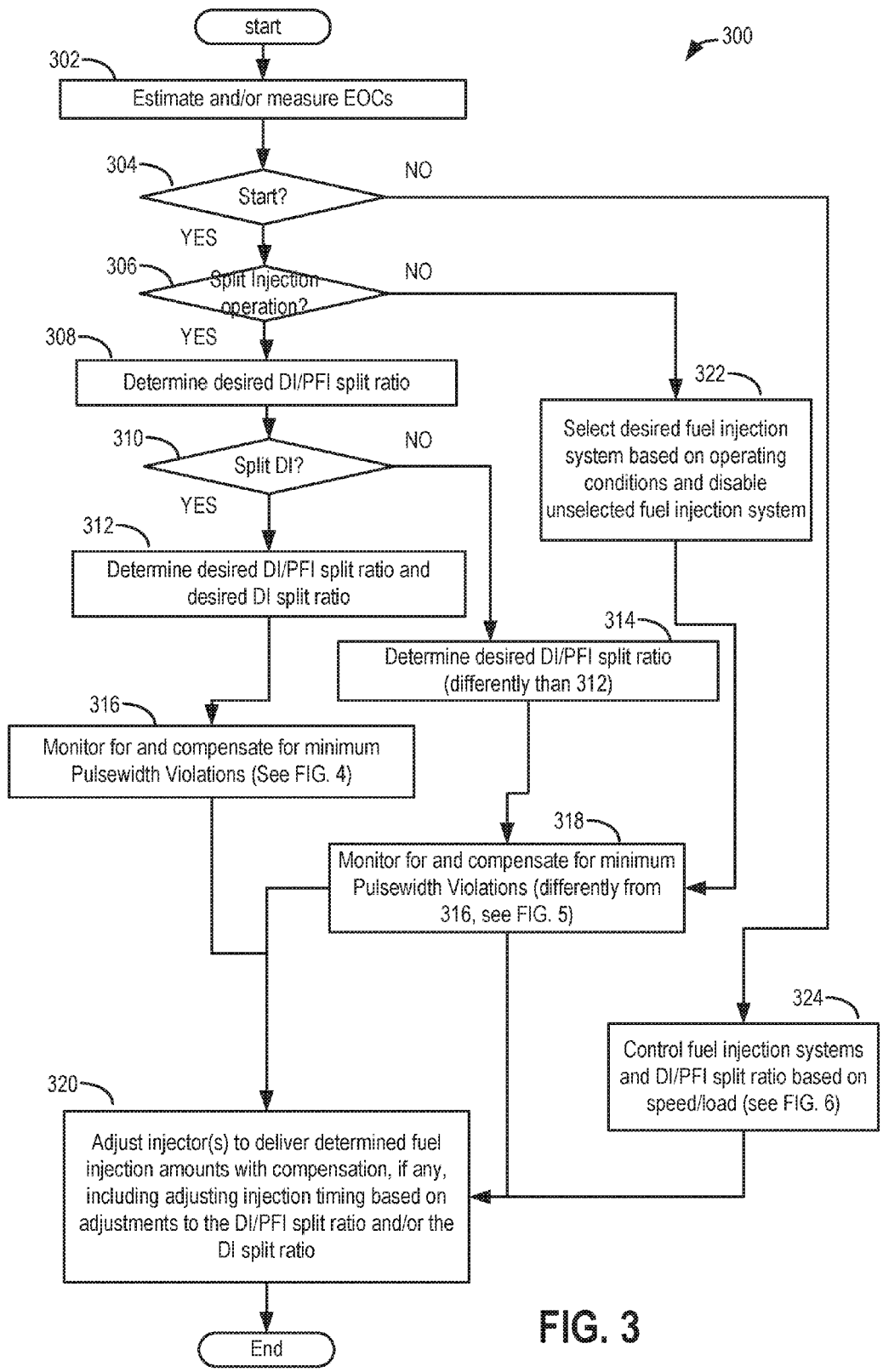
FIG. 3 depicts an example high level flow chart for operating an internal combustion engine including a port-fuel injection system and a direct-fuel injection system according to the present disclosure.
Figure 4:
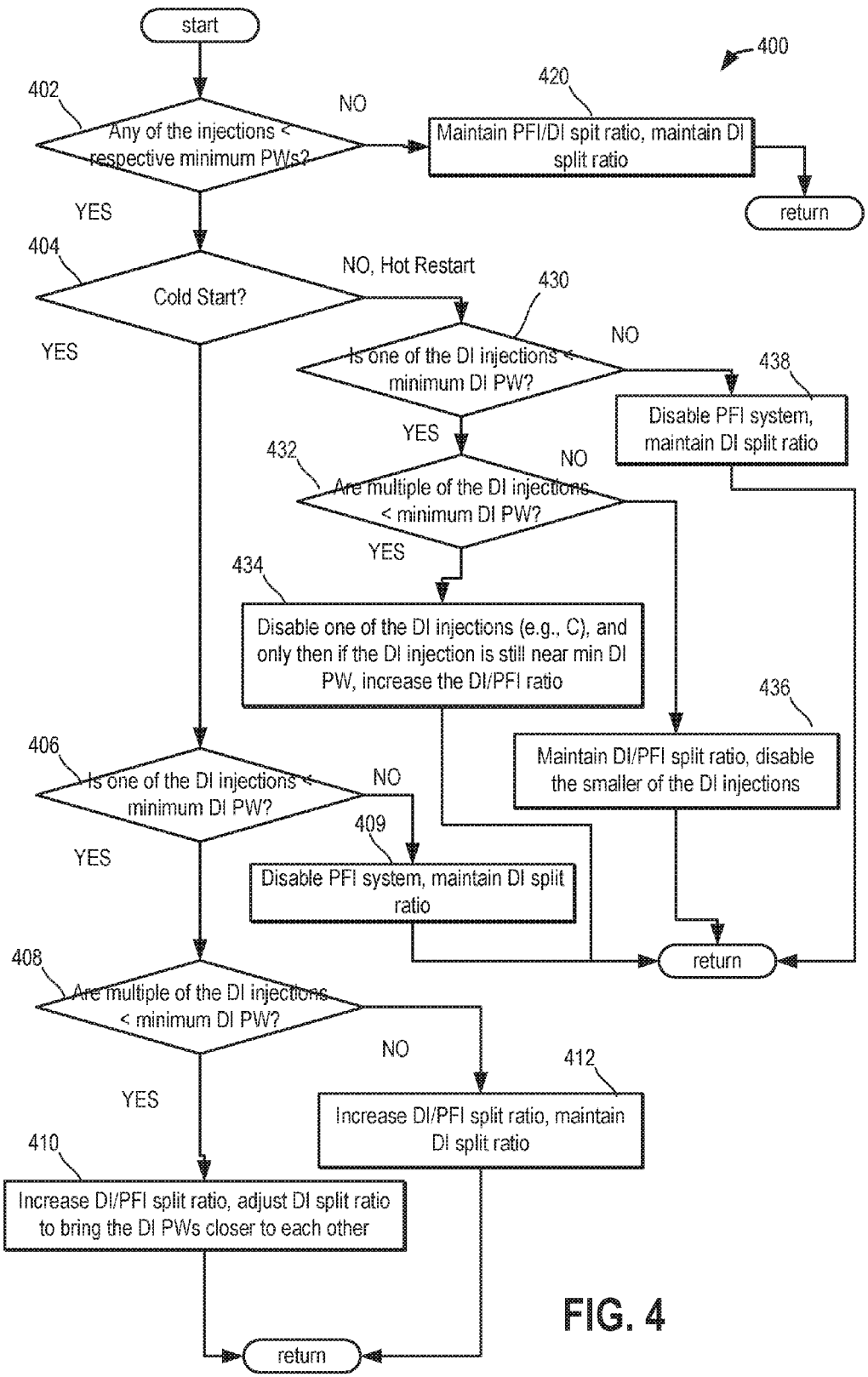
FIGS. 4-5 depict example flow charts for reducing minimum pulsewidth issues.
Figure 5:
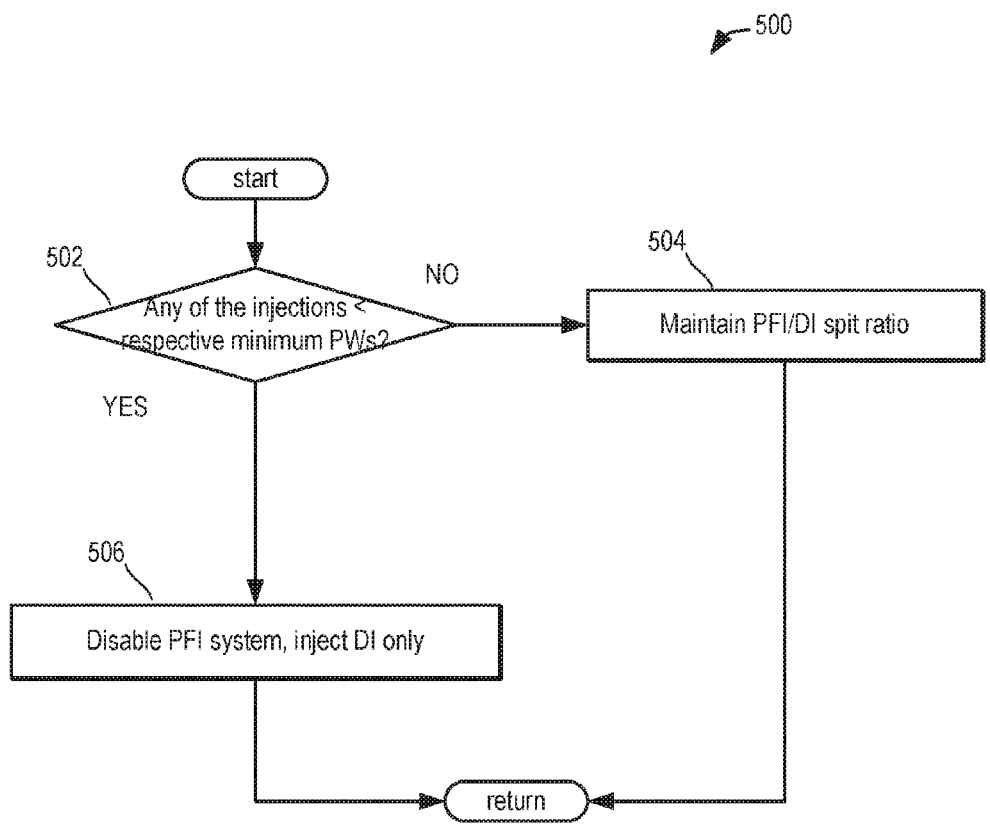

In one non-limiting example, the engine may be configured as illustrated in FIG. 1. Further, additional components of an associated fuel system are depicted at FIG. 2. An engine controller may be configured to perform a control routine, in combination with sensors and actuators such as those in FIGS. 1-2, including routines as illustrated in FIGS. 3-5. For example, the routine of FIG. 3 illustrates an overall method for controlling fuel injection utilizing additional operation such as the compensation for reaching minimum pulsewidths in FIGS. 4-5 and the engine running control approach illustrated via the table in FIG. 6. The routines make different adjustments to a desired ratio of not only the port to direct injection, but also the ratio of direct injections, where applicable. An example timeline for operating in accordance with the above methods and systems is depicted in FIG. 7.

Turning now to FIG. 1, it shows a schematic diagram of one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via intake cam 51. Similarly, exhaust valve 54 may be controlled by controller 12 via exhaust cam 53. Alternatively, the variable valve actuator may be electric, electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

In some embodiments, each cylinder of engine 10 may be configured with one or more fuel injectors for providing fuel thereto. As a non-limiting example, cylinder 30 is shown including two fuel injectors 166 and 170. Fuel injector 166 is shown coupled directly to cylinder 30 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 30. Thus, fuel injector 166 is a direct fuel injector in communication with cylinder 30. While FIG. 1 shows injector 166 as a side injector, it may also be located overhead of the piston, such as near the position of spark plug 92. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from high pressure fuel system 172 including a fuel tank, fuel pumps, a fuel rail, and driver 168. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12. The injectors are driven by signals that cause the pintle of the injectors to open and close via solenoids. The pulse signal sent to the injector controls its opening timing, closing timing, etc. The width of the opening is generally mapped to a desired fuel amount, and may be referred to as a pulsewidth. Injectors may have minimum pulsewidths below which the injector does not properly or fully open and thus control of the fuel injection amount becomes degraded.

Fuel injector 170 is shown arranged in intake passage 42 (e.g., within intake manifold 44), rather than in cylinder 30, in a configuration that provides what is known as port injection of fuel (hereafter referred to as "PFI") into the intake port upstream of cylinder 30. From the intake port, the fuel may be delivered to cylinder 30. Thus, fuel injector 170 is a port fuel injector in communication with cylinder 30. Fuel injector 170 may inject fuel in proportion to the pulse width of signal FPW-2 received from controller 12 via electronic driver 171. Fuel may be delivered to fuel injector 170 by fuel system 172.

Fuel may be delivered by both injectors to the cylinder during a single cycle of the cylinder. For example, each injector may deliver a portion of a total fuel injection that is combusted in cylinder 30. Further, the distribution and/or relative amount of fuel delivered from each injector may vary with operating conditions such as described herein below. The relative distribution of the total injected fuel among injectors 166 and 170 may be referred to as a first injection ratio. For example, injecting a larger amount of the fuel for a combustion event via (port) injector 170 may be an example of a higher first ratio of port to direct injection, while injecting a larger amount of the fuel for a combustion event via (direct) injector 166 may be a lower first ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke, or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio, herein also referred to as a split ratio. For example, a split ratio (or second injection ratio) of 1 may include all of the direct injected fuel being delivered in the intake stroke, and none of the direct injected fuel being delivered in the compression stroke. As another example, a split ratio (or second injection ratio) of 0 may include all of the direct injected fuel being delivered in the compression stroke, and none of the direct injected fuel being delivered in the intake stroke. As yet another example, a split ratio (or second injection ratio) of 0.5 may include 50% of the direct injected fuel being delivered in the intake stroke, and a remaining 50% of the direct injected fuel being delivered in the compression stroke. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or an appropriate combination thereof.

As described above, FIG. 1 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel system 172 may include one fuel tank or multiple fuel tanks. In embodiments where fuel system 172 includes multiple fuel tanks, the fuel tanks may hold fuel with the same fuel qualities or may hold fuel with different fuel qualities, such as different fuel compositions. These differences may include different alcohol content, different octane, different heat of vaporizations, different fuel blends, and/or combinations thereof etc. In one example, fuels with different alcohol contents could include gasoline, ethanol, methanol, or alcohol blends such as E85 (which is approximately 85% ethanol and 15% gasoline) or M85 (which is approximately 85% methanol and 15% gasoline). Other alcohol containing fuels could be a mixture of alcohol and water, a mixture of alcohol, water and gasoline etc. In some examples, fuel system 172 may include a fuel tank holding a liquid fuel, such as gasoline, and also include a fuel tank holding a gaseous fuel, such as CNG. Fuel injectors 166 and 170 may be configured to inject fuel from the same fuel tank, from different fuel tanks, from a plurality of the same fuel tanks, or from an overlapping set of fuel tanks. Fuel system 172 may include a lower pressure fuel pump 175 (such as a lift pump) and a higher pressure fuel pump 173. As detailed with reference to the fuel system of FIG. 2, the lower pressure fuel pump 175 may lift fuel from a fuel tank, the fuel then further pressurized by higher pressure fuel pump 173. In addition, lower pressure fuel pump 175 may provide fuel to a port injection fuel rail while higher pressure fuel pump 173 delivers fuel to a direct injection fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Pressure, temperature, and mass air flow may be measured at various points along intake passage 42 and intake manifold 44. For example, intake passage 42 may include a mass air flow sensor 120 for measuring clean air mass flow entering through throttle 63. The clean air mass flow may be communicated to controller 12 via the MAF signal.

Engine 10 may further include a compression device such as a turbocharger or supercharger including at least a compressor 162 arranged upstream of intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. A charge air cooler 154 may be included downstream from compressor 162 and upstream of intake valve 52. Charge air cooler 154 may be configured to cool gases that have been heated by compression via compressor 162, for example. In one embodiment, charge air cooler 154 may be upstream of throttle 62. Pressure, temperature, and mass air flow may be measured downstream of compressor 162, such as with sensor 145 or 147. The measured results may be communicated to controller 12 from sensors 145 and 147 via signals 148 and 149, respectively. Pressure and temperature may be measured upstream of compressor 162, such as with sensor 153, and communicated to controller 12 via signal 155.

Further, in the disclosed embodiments, an exhaust gas recirculation (EGR) system may route a desired portion of exhaust gas from exhaust passage 48 to intake manifold 44. FIG. 1 shows a high pressure EGR (HP-EGR) system and a low pressure EGR (LP-EGR) system, but an alternative embodiment may include only an LP-EGR system. The HP-EGR is routed through HP-EGR passage 140 from upstream of turbine 164 to downstream of compressor 162. The amount of HP-EGR provided to intake manifold 44 may be varied by controller 12 via HP-EGR valve 142. The LP-EGR is routed through LP-EGR passage 150 from downstream of turbine 164 to upstream of compressor 162. The amount of LP-EGR provided to intake manifold 44 may be varied by controller 12 via LP-EGR valve 152. The HP-EGR system may include HP-EGR cooler 146 and the LP-EGR system may include LP-EGR cooler 158 to reject heat from the EGR gases to engine coolant, for example. Thus, engine 10 may comprise both an HP-EGR and an LP-EGR system to route exhaust gases back to the intake.

Under some conditions, the EGR system may be used to regulate the temperature of the air and fuel mixture within combustion chamber 30. Thus, it may be desirable to measure or estimate the EGR mass flow. EGR sensors may be arranged within EGR passages and may provide an indication of one or more of mass flow, pressure, temperature, concentration of $O_2$, and concentration of the exhaust gas. For example, an HP-EGR sensor 144 may be arranged within HP-EGR passage 140.

In some embodiments, one or more sensors may be positioned within LP-EGR passage 150 to provide an indication of one or more of a pressure, temperature, and air-fuel ratio of exhaust gas recirculated through the LP-EGR passage. Exhaust gas diverted through LP-EGR passage 150 may be diluted with fresh intake air at a mixing point located at the junction of LP-EGR passage 150 and intake passage 42. Specifically, by adjusting LP-EGR valve 152 in coordination with first air intake throttle 63 (positioned in the air intake passage of the engine intake, upstream of the compressor), a dilution of the EGR flow may be adjusted.

A percent dilution of the LP-EGR flow may be inferred from the output of a sensor 145 in the engine intake gas stream. Specifically, sensor 145 may be positioned downstream of first intake throttle 63, downstream of LP-EGR valve 152, and upstream of second main intake throttle 62, such that the LP-EGR dilution at or close to the main intake throttle may be accurately determined. Sensor 145 may be, for example, an oxygen sensor such as a UEGO sensor.

Exhaust gas sensor 126 is shown coupled to exhaust passage 48 downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor.

Emission control devices 71 and 72 are shown arranged along exhaust passage 48 downstream of exhaust gas sensor 126. Devices 71 and 72 may be a selective catalytic reduction (SCR) system, three way catalyst (TWC), $NO_x$ trap, various other emission control devices, or combinations thereof. For example, device 71 may be a TWC and device 72 may be a particulate filter (PF). In some embodiments, PF 72 may be located downstream of TWC 71 (as shown in FIG. 1), while in other embodiments, PF 72 may be positioned upstream of TWC 72 (not shown in FIG. 1). PF 72 may include a soot load sensor 198, which may communicate a particulate matter loading amount via signal PM to controller 12.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft. The controller 12 receives signals from the various sensors of FIG. 1 (and those of FIG. 2 described below) and employs the various actuators of FIG. 1 (and those of FIG. 2 described below) to adjust engine operation based on the received signals and instructions stored on a memory of the controller.

Storage medium read-only memory 106 can be programmed with computer readable data representing instructions executable by processor 102 for performing the methods described below as well as other variants that are anticipated but not specifically listed. An example routine that may be performed by the controller is described at FIG. 3.

FIG. 2 schematically depicts an example embodiment 200 of a fuel system, such as fuel system 172 of FIG. 1. Fuel system 200 may be operated to deliver fuel to an engine, such as engine 10 of FIG. 1. Fuel system 200 may be operated by a controller to perform some or all of the operations described with reference to the process flows of FIG. 3.

Fuel system 200 includes a fuel storage tank 210 for storing the fuel on-board the vehicle, a lower pressure fuel pump (LPP) 212 (herein also referred to as fuel lift pump 212), and a higher pressure fuel pump (HPP) 214 (herein also referred to as fuel injection pump 214). Fuel may be provided to fuel tank 210 via fuel filling passage 204. In one example, LPP 212 may be an electrically-powered lower pressure fuel pump disposed at least partially within fuel tank 210. LPP 212 may be operated by a controller 222 (e.g., controller 12 of FIG. 1) to provide fuel to HPP 214 via fuel passage 218. LPP 212 can be configured as what may be referred to as a fuel lift pump. As one example, LPP 212 may be a turbine (e.g., centrifugal) pump including an electric (e.g., DC) pump motor, whereby the pressure increase across the pump and/or the volumetric flow rate through the pump may be controlled by varying the electrical power provided to the pump motor, thereby increasing or decreasing the motor speed. For example, as the controller reduces the electrical power that is provided to lift pump 212, the volumetric flow rate and/or pressure increase across the lift pump may be reduced. The volumetric flow rate and/or pressure increase across the pump may be increased by increasing the electrical power that is provided to lift pump 212. As one example, the electrical power supplied to the lower pressure pump motor can be obtained from an alternator or other energy storage device on-board the vehicle (not shown), whereby the control system can control the electrical load that is used to power the lower pressure pump. Thus, by varying the voltage and/or current provided to the lower pressure fuel pump, the flow rate and pressure of the fuel provided at the inlet of the higher pressure fuel pump 214 is adjusted.

LPP 212 may be fluidly coupled to a filter 217, which may remove small impurities contained in the fuel that could potentially damage fuel handling components. A check valve 213, which may facilitate fuel delivery and maintain fuel line pressure, may be positioned fluidly upstream of filter 217. With check valve 213 upstream of the filter 217, the compliance of low-pressure passage 218 may be increased since the filter may be physically large in volume. Furthermore, a pressure relief valve 219 may be employed to limit the fuel pressure in low-pressure passage 218 (e.g., the output from lift pump 212). Relief valve 219 may include a ball and spring mechanism that seats and seals at a specified pressure differential, for example. The pressure differential set-point at which relief valve 219 may be configured to open may assume various suitable values; as a non-limiting example the set-point may be 6.4 bar or 5 bar (g). An orifice 223 may be utilized to allow for air and/or fuel vapor to bleed out of the lift pump 212. This bleed at 223 may also be used to power a jet pump used to transfer fuel from one location to another within the tank 210. In one example, an orifice check valve (not shown) may be placed in series with orifice 223. In some embodiments, fuel system 8 may include one or more (e.g., a series) of check valves fluidly coupled to low-pressure fuel pump 212 to impede fuel from leaking back upstream of the valves. In this context, upstream flow refers to fuel flow traveling from fuel rails 250, 260 towards LPP 212 while downstream flow refers to the nominal fuel flow direction from the LPP towards the HPP 214 and thereon to the fuel rails.

Fuel lifted by LPP 212 may be supplied at a lower pressure into a fuel passage 218 leading to an inlet 203 of HPP 214. HPP 214 may then deliver fuel into a first fuel rail 250 coupled to one or more fuel injectors of a first group of direct injectors 252 (herein also referred to as a first injector group). Thus fuel rail 250 is in communication with a direct injector. Fuel lifted by the LPP 212 may also be supplied to a second fuel rail 260 coupled to one or more fuel injectors of a second group of port injectors 262 (herein also referred to as a second injector group). Thus fuel rail 260 is in communication with a port injector. As elaborated below, HPP 214 may be operated to raise the pressure of fuel delivered to each of the first and second fuel rail above the lift pump pressure, with the first fuel rail coupled to the direct injector group operating with a variable high pressure while the second fuel rail coupled to the port injector group operates with a fixed high pressure. Thus, high-pressure fuel pump 214 is in communication with each of fuel rail 260 and fuel rail 250. As a result, high pressure port and direct injection may be enabled. The high pressure fuel pump is coupled downstream of the low pressure lift pump with no additional pump positioned in between the high pressure fuel pump and the low pressure lift pump.

While each of first fuel rail 250 and second fuel rail 260 are shown dispensing fuel to four fuel injectors of the respective injector group 252, 262, it will be appreciated that each fuel rail 250, 260 may dispense fuel to any suitable number of fuel injectors. As one example, first fuel rail 250 may dispense fuel to one fuel injector of first injector group 252 for each cylinder of the engine while second fuel rail 260 may dispense fuel to one fuel injector of second injector group 262 for each cylinder of the engine. Controller 222 can individually actuate each of the port injectors 262 via a port injection driver 237 and actuate each of the direct injectors 252 via a direct injection driver 238. The controller 222, the drivers 237, 238 and other suitable engine system controllers can comprise a control system. While the drivers 237, 238 are shown external to the controller 222, it should be appreciated that in other examples, the controller 222 can include the drivers 237, 238 or can be configured to provide the functionality of the drivers 237, 238. Controller 222 may include additional components not shown, such as those included in controller 12 of FIG. 1.

HPP 214 may be an engine-driven, positive-displacement pump. As one non-limiting example, HPP 214 may be a BOSCH HDP5 HIGH PRESSURE PUMP, which utilizes a solenoid activated control valve (e.g., fuel volume regulator, magnetic solenoid valve, etc.) 236 to vary the effective pump volume of each pump stroke. The outlet check valve of HPP is mechanically controlled and not electronically controlled by an external controller. HPP 214 may be mechanically driven by the engine in contrast to the motor driven LPP 212. HPP 214 includes a pump piston 228, a pump compression chamber 205 (herein also referred to as compression chamber), and a step-room 227. Pump piston 228 receives a mechanical input from the engine crank shaft or cam shaft via cam 230, thereby operating the HPP according to the principle of a cam-driven single-cylinder pump. A sensor (not shown in FIG. 2) may be positioned near cam 230 to enable determination of the angular position of the cam (e.g., between 0 and 360 degrees), which may be relayed to controller 222.

Fuel system 200 may optionally further include accumulator 215. When included, accumulator 215 may be positioned downstream of lower pressure fuel pump 212 and upstream of higher pressure fuel pump 214, and may be configured to hold a volume of fuel that reduces the rate of fuel pressure increase or decrease between fuel pumps 212 and 214. For example, accumulator 215 may be coupled in fuel passage 218, as shown, or in a bypass passage 211 coupling fuel passage 218 to the step-room 227 of HPP 214. The volume of accumulator 215 may be sized such that the engine can operate at idle conditions for a predetermined period of time between operating intervals of lower pressure fuel pump 212. For example, accumulator 215 can be sized such that when the engine idles, it takes one or more minutes to deplete pressure in the accumulator to a level at which higher pressure fuel pump 214 is incapable of maintaining a sufficiently high fuel pressure for fuel injectors 252, 262. Accumulator 215 may thus enable an intermittent operation mode (or pulsed mode) of lower pressure fuel pump 212. By reducing the frequency of LPP operation, power consumption is reduced. In other embodiments, accumulator 215 may inherently exist in the compliance of fuel filter 217 and fuel passage 218, and thus may not exist as a distinct element.

A lift pump fuel pressure sensor 231 may be positioned along fuel passage 218 between lift pump 212 and higher pressure fuel pump 214. In this configuration, readings from sensor 231 may be interpreted as indications of the fuel pressure of lift pump 212 (e.g., the outlet fuel pressure of the lift pump) and/or of the inlet pressure of higher pressure fuel pump. Readings from sensor 231 may be used to assess the operation of various components in fuel system 200, to determine whether sufficient fuel pressure is provided to higher pressure fuel pump 214 so that the higher pressure fuel pump ingests liquid fuel and not fuel vapor, and/or to minimize the average electrical power supplied to lift pump 212. While lift pump fuel pressure sensor 231 is shown as being positioned downstream of accumulator 215, in other embodiments the sensor may be positioned upstream of the accumulator.

First fuel rail 250 includes a first fuel rail pressure sensor 248 for providing an indication of direct injection fuel rail pressure to the controller 222. Likewise, second fuel rail 260 includes a second fuel rail pressure sensor 258 for providing an indication of port injection fuel rail pressure to the controller 222. An engine speed sensor 233 can be used to provide an indication of engine speed to the controller 222. The indication of engine speed can be used to identify the speed of higher pressure fuel pump 214, since the pump 214 is mechanically driven by the engine 202, for example, via the crankshaft or camshaft.

First fuel rail 250 is coupled to an outlet 208 of HPP 214 along fuel passage 278. In comparison, second fuel rail 260 is coupled to an inlet 203 of HPP 214 via fuel passage 288. A check valve and a pressure relief valve may be positioned between the outlet 208 of the HPP 214 and the first fuel rail. In addition, pressure relief valve 272, arranged parallel to check valve 274 in bypass passage 279, may limit the pressure in fuel passage 278, located downstream of HPP 214 and upstream of first fuel rail 250. For example, pressure relief valve 272 may limit the pressure in fuel passage 278 to an upper threshold pressure (e.g., 200 bar). As such, pressure relief valve 272 may limit the pressure that would otherwise be generated in fuel passage 278 if control valve 236 were (intentionally or unintentionally) open and while high pressure fuel pump 214 were pumping.

One or more check valves and pressure relief valves may also be coupled to fuel passage 218, downstream of LPP 212 and upstream of HPP 214. For example, check valve 234 may be provided in fuel passage 218 to reduce or prevent back-flow of fuel from high pressure pump 214 to low pressure pump 212 and fuel tank 210. In addition, pressure relief valve 232 may be provided in a bypass passage, positioned parallel to check valve 234. Pressure relief valve 232 may limit the pressure to its left to 10 bar higher than the pressure at sensor 231.

Controller 222 may be configured to regulate fuel flow into HPP 214 through control valve 236 by energizing or de-energizing the solenoid valve (based on the solenoid valve configuration) in synchronism with the driving cam. Accordingly, the solenoid activated control valve 236 may be operated in a first mode where the valve 236 is positioned within HPP inlet 203 to limit (e.g. inhibit) the amount of fuel traveling through the solenoid activated control valve 236. Depending on the timing of the solenoid valve actuation, the volume transferred to the fuel rail 250 is varied. The solenoid valve may also be operated in a second mode where the solenoid activated control valve 236 is effectively disabled and fuel can travel upstream and downstream of the valve, and in and out of HPP 214.

As such, solenoid activated control valve 236 may be configured to regulate the mass (or volume) of fuel compressed into the direct injection fuel pump. In one example, controller 222 may adjust a closing timing of the solenoid pressure control check valve to regulate the mass of fuel compressed. For example, a late pressure control valve closing may reduce the amount of fuel mass ingested into compression chamber 205. The solenoid activated check valve opening and closing timings may be coordinated with respect to stroke timings of the direct injection fuel pump.

Pressure relief valve 232 allows fuel flow out of solenoid activated control valve 236 toward the LPP 212 when pressure between pressure relief valve 232 and solenoid operated control valve 236 is greater than a predetermined pressure (e.g., 10 bar). When solenoid operated control valve 236 is deactivated (e.g., not electrically energized), solenoid operated control valve operates in a pass-through mode and pressure relief valve 232 regulates pressure in compression chamber 205 to the single pressure relief set-point of pressure relief valve 232 (e.g., 10 bar above the pressure at sensor 231). Regulating the pressure in compression chamber 205 allows a pressure differential to form from the piston top to the piston bottom. The pressure in step-room 227 is at the pressure of the outlet of the low pressure pump (e.g., 5 bar) while the pressure at piston top is at pressure relief valve regulation pressure (e.g., 15 bar). The pressure differential allows fuel to seep from the piston top to the piston bottom through the clearance between the piston and the pump cylinder wall, thereby lubricating HPP 214.

Piston 228 reciprocates up and down. HPP 214 is in a compression stroke when piston 228 is traveling in a direction that reduces the volume of compression chamber 205. HPP 214 is in a suction stroke when piston 228 is traveling in a direction that increases the volume of compression chamber 205.

A forward flow outlet check valve 274 may be coupled downstream of an outlet 208 of the compression chamber 205. Outlet check valve 274 opens to allow fuel to flow from the high pressure pump outlet 208 into a fuel rail only when a pressure at the outlet of direct injection fuel pump 214 (e.g., a compression chamber outlet pressure) is higher than the fuel rail pressure. Thus, during conditions when direct injection fuel pump operation is not requested, controller 222 may deactivate solenoid activated control valve 236 and pressure relief valve 232 regulates pressure in compression chamber 205 to a single substantially constant pressure during most of the compression stroke. On the intake stroke the pressure in compression chamber 205 drops to a pressure near the pressure of the lift pump (212). Lubrication of DI pump 214 may occur when the pressure in compression chamber 205 exceeds the pressure in step-room 227. This difference in pressures may also contribute to pump lubrication when controller 222 deactivates solenoid activated control valve 236. One result of this regulation method is that the fuel rail is regulated to a minimum pressure, approximately the pressure relief of pressure relief valve 232. Thus, if pressure relief valve 232 has a pressure relief setting of 10 bar, the fuel rail pressure becomes 15 bar because this 10 bar adds to the 5 bar of lift pump pressure. Specifically, the fuel pressure in compression chamber 205 is regulated during the compression stroke of direct injection fuel pump 214. Thus, during at least the compression stroke of direct injection fuel pump 214, lubrication is provided to the pump. When direct fuel injection pump enters a suction stroke, fuel pressure in the compression chamber may be reduced while still some level of lubrication may be provided as long as the pressure differential remains. Another pressure relief valve 272 may be placed in parallel with check valve 274. Pressure relief valve 272 allows fuel flow out of the DI fuel rail 250 toward pump outlet 208 when the fuel rail pressure is greater than a predetermined upper threshold pressure. As such, while the direct injection fuel pump is reciprocating, the flow of fuel between the piston and bore ensures sufficient pump lubrication and cooling.

The lift pump may be transiently operated in a pulsed mode where the lift pump operation is adjusted based on a pressure estimated at the outlet of the lift pump and inlet of the high pressure pump. In particular, responsive to high pressure pump inlet pressure falling below a fuel vapor pressure, the lift pump may be operated until the inlet pressure is at or above the fuel vapor pressure. This reduces the risk of the high pressure fuel pump ingesting fuel vapors (instead of fuel) and ensuing engine stall events.

It is noted here that the high pressure pump 214 of FIG. 2 is presented as an illustrative example of one possible configuration for a high pressure pump. Components shown in FIG. 2 may be removed and/or changed while additional components not presently shown may be added to pump 214 while still maintaining the ability to deliver high-pressure fuel to a direct injection fuel rail and a port injection fuel rail.

Solenoid activated control valve 236 may also be operated to direct fuel back-flow from the high pressure pump to one of pressure relief valve 232 and accumulator 215. For example, control valve 236 may be operated to generate and store fuel pressure in accumulator 215 for later use. One use of accumulator 215 is to absorb fuel volume flow that results from the opening of compression pressure relief valve 232. Accumulator 227 sources fuel as check valve 234 opens during the intake stroke of pump 214. Another use of accumulator 215 is to absorb/source the volume changes in the step room 227. Yet another use of accumulator 215 is to allow intermittent operation of lift pump 212 to gain an average pump input power reduction over continuous operation.

While the first direct injection fuel rail 250 is coupled to the outlet 208 of HPP 214 (and not to the inlet of HPP 214), second port injection fuel rail 260 is coupled to the inlet 203 of HPP 214 (and not to the outlet of HPP 214). Although inlets, outlets, and the like relative to compression chamber 205 are described herein, it may be appreciated that there may be a single conduit into compression chamber 205. The single conduit may serve as inlet and outlet. In particular, second fuel rail 260 is coupled to HPP inlet 203 at a location upstream of solenoid activated control valve 236 and downstream of check valve 234 and pressure relief valve 232. Further, no additional pump may be required between lift pump 212 and the port injection fuel rail 260. As elaborated below, the specific configuration of the fuel system with the port injection fuel rail coupled to the inlet of the high pressure pump via a pressure relief valve and a check valve enables the pressure at the second fuel rail to be raised via the high pressure pump to a fixed default pressure that is above the default pressure of the lift pump. That is, the fixed high pressure at the port injection fuel rail is derived from the high pressure piston pump.

When the high pressure pump 214 is not reciprocating, such as at key-up before cranking, check valve 244 allows the second fuel rail to fill at 5 bar. As the pump chamber displacement becomes smaller due to the piston moving upward, the fuel flows in one of two directions. If the spill valve 236 is closed, the fuel goes into the high pressure fuel rail 250 via high pressure fuel pump outlet 208. If the spill valve 236 is open, the fuel goes either into the low pressure fuel rail 250 or through the compression relief valve 232 via high pressure fuel pump inlet 203. In this way, the high pressure fuel pump is operated to deliver fuel at a variable high pressure (such as between 15-200 bar) to the direct fuel injectors 252 via the first fuel rail 250 while also delivering fuel at a fixed high pressure (such as at 15 bar) to the port fuel injectors 262 via the second fuel rail 260. The variable pressure may include a minimum pressure that is at the fixed pressure.

Thus spill valve 236 may be operated to control a bulk fuel flow from the high pressure fuel pump outlet to DI fuel rail 250 to be substantially equal to zero, and to control a bulk fuel flow from the high pressure fuel pump inlet to PFI fuel rail 260. As one example, when one or more direct injectors 252 are deactivated, spill valve 236 may be operated to control the bulk fuel flow from HPP outlet 208 to DI fuel rail 250 to be substantially equal to zero. Additionally, the bulk fuel flow from HPP outlet 208 to DI fuel rail 250 may be controlled to be substantially equal to zero if direct injectors 252 are activated while pressure within DI fuel rail 250 is above a minimum pressure threshold (e.g., 15 bar). In both conditions, bulk fuel flow form HPP inlet 203 to PFI fuel rail 260 may be controlled to be substantially greater than zero. When fuel flow to one of fuel rails 250 or 260 is controlled to be substantially equal to zero, fuel flow thereto may be herein be referred to as disabled.

In the configuration depicted at FIG. 2, the fixed pressure of the port injection fuel rail is the same as the minimum pressure for the direct injection fuel rail, both being higher than the default pressure of the lift pump. Herein, the fuel delivery from the high pressure pump is controlled via the upstream (solenoid activated) control valve and further via the various check valve and pressure relief valves coupled to the inlet of the high pressure pump. By adjusting operation of the solenoid activated control valve, the fuel pressure at the first fuel rail is raised from the fixed pressure to the variable pressure while maintaining the fixed pressure at the second fuel rail. Valves 244 and 242 work in conjunction to keep the low pressure fuel rail 260 pressurized to 15 bar during the pump inlet stroke. Pressure relief valve 242 simply limits the pressure that can build in fuel rail 250 due to thermal expansion of fuel. A typical pressure relief setting may be 20 bar.

Controller 222 can also control the operation of each of fuel pumps 212, and 214 to adjust an amount, pressure, flow rate, etc., of a fuel delivered to the engine. As one example, controller 12 can vary a pressure setting, a pump stroke amount, a pump duty cycle command, and/or fuel flow rate of the fuel pumps to deliver fuel to different locations of the fuel system. A driver (not shown) electronically coupled to controller 222 may be used to send a control signal to the low pressure pump, as required, to adjust the output (e.g., speed) of the low pressure pump. In some examples, the solenoid valve may be configured such that high pressure fuel pump 214 delivers fuel only to first fuel rail 250, and in such a configuration, second fuel rail 260 may be supplied fuel at the lower outlet pressure of lift pump 212.

Controller 222 can control the operation of each of injector groups 252 and 262. For example, controller 222 may control the distribution and/or relative amount of fuel delivered from each injector may vary with operating conditions, such as engine load, knock, and exhaust temperature. Specifically, controller 222 may adjust a direct injection fuel ratio by sending appropriate signals to port fuel injection driver 237 and direct injection 238, which may in turn actuate the respective port fuel injectors 262 and direct injectors 252 with desired pulse-widths for achieving the desired injection ratios. Additionally, controller 222 may selectively enable and disable (i.e., activate or deactivate) one or more of the injector groups based on fuel pressure within each rail as well as minimum pulse width triggers.

In this way, the components of FIGS. 1-2 enables a system comprising: an engine having a cylinder; a port fuel injector mounted in a port of the cylinder; a direct fuel injector mounted directly into the cylinder; a temperature sensor for sensing engine temperature; and a controller having instructions stored in memory that when executed cause, during a start, the injector to inject, during a single cylinder cycle, a port fuel injection, an intake stroke direct fuel injection, and a compression stroke direct fuel injection; and responsive to one of the direct injections reaching a minimum direct injection pulsewidth, adjusting a ratio of port to direct fuel injection.

FIG. 3 shows an example method 300 for operating an engine configured with multi fuel injection capabilities, such as internal combustion engine 10 of FIG. 1 configured with fuel system 200 of FIG. 2. Specifically, method 300 enables control of the direct and port fuel injectors of each cylinder while monitoring for and compensating for potential operation that approaches the minimum fuel injector pulsewidth.

Instructions for carrying out method 300 and the rest of the methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

It should be appreciated that the adjustment of the port to direct injection ratio for a given cylinder and/or the direct injection split for a given cylinder, may be adjusted differently depending on the situation, including depending on whether hot re-start engine conditions are present or cold engine start conditions are present. Further, differences may be provided for dealing with minimum pulsewidth triggers depending on whether hesitation fuel (e.g., degraded fuel quality) is present. If hesitation fuel is detected, then the total fuel mass for the engine may be adjusted while maintaining the port to direct injection ratio within the limits of minimum and maximum pulse widths of the fuel injector. The engine start conditions may be based on engine coolant temperature at the start, intake air temperature, ambient temperature, and/or combinations thereof. In one example, the method may differentiate between a hot engine restart and a cold engine start based on engine coolant temperature relative to air temperature at the start, with the cold start being at a lower initial engine temperature than the hot restart. Also, the hot restart may include automatic engine start-stop restarts where the engine was shut down automatically at a vehicle stop independent of a driver vehicle-off request (e.g., push button engine stop).

At 302, the method includes estimating and/or measuring engine operating conditions. These may include, for example, engine coolant temperature, intake air temperature, ambient temperature, barometric pressure, driver torque demand, etc.

At 304, the method includes confirming if an engine start condition is present. In one example, an engine start condition may be confirmed responsive to a driver key-on or vehicle-on event, such as via an active or a passive key. An engine start may alternatively be confirmed responsive to automatic engine restart conditions being met, such as when a battery state of charge drops below a threshold, or there is a demand for air conditioning.

If an engine start condition is not confirmed, the method moves to 324 wherein engine fuel injection systems including a fuel split ratio (which may include a ratio of port injected fuel to direct injected fuel, as well as a ratio of intake stroke direct injected fuel relative to compression stroke direct injected fuel) is adjusted based on engine speed/load conditions. For example, the controller may refer to the engine speed/load map of FIG. 6 to determine an amount of fuel to be injected, a fuel injection type (or types), as well as a number of injections. In one example, at lower engine speed/loads, and cooler engine conditions, all of the injected fuel may be delivered via a single port injection in an exhaust stroke or an intake stroke. As another example, at higher engine speed/loads and warmer engine conditions, all if the injected fuel may be delivered via multiple direct injections in an intake stroke and/or a compression stroke. As yet another example, at mid speed-loads, a portion of the fuel may be delivered via port injection, and a remainder of the fuel may be delivered via (single or multiple) direct injections.

If an engine start is confirmed, at 306, it may be determined if split fuel injection operation is desired at the engine start. As used herein, the split injection operation may include a portion of the total fuel of a given cylinder cycle delivered via port injection, and a remainder of the total fuel of the given cylinder cycle delivered via (single or multiple) direct injection. The controller may refer a look-up table stored as a function of engine start parameters, such as engine temperature at the start, as well as fuel alcohol content, to determine if split injection is to be enabled for the current engine start. In one example, split fuel injection may be enabled at an engine start responsive to the engine temperature being lower than a threshold, or the alcohol content of the fuel being injected being higher than a threshold. The split ratio may be further determined based on combustion event number since a first combustion event of the engine start.

If split injection is determined, at 308, a split injection ratio of PFI to DI fuel is determined. In one example, split fuel injection may be enabled for both engine cold-starts (where the engine temperature at the engine start is lower) and engine hot starts (where the engine temperature at the engine start is higher), however, the split ratio of port injected fuel to direct injected fuel for the starts may be different. As one example, during engine cold starts, the split ratio may include a higher ratio of port injected fuel to direct injected fuel on a given cylinder cycle (due to the higher particulate matter emissions of direct injected cold fuel). As another example, during engine hot starts, the split ratio may include a lower ratio of port injected fuel to direct injected fuel on a given cylinder cycle (due to the higher efficiency of the direct injected hot fuel). In one example, the desired split ratio at 308 may be a base number determined from a controller look-up table, such as the example table of FIG. 6.

Figure 6:
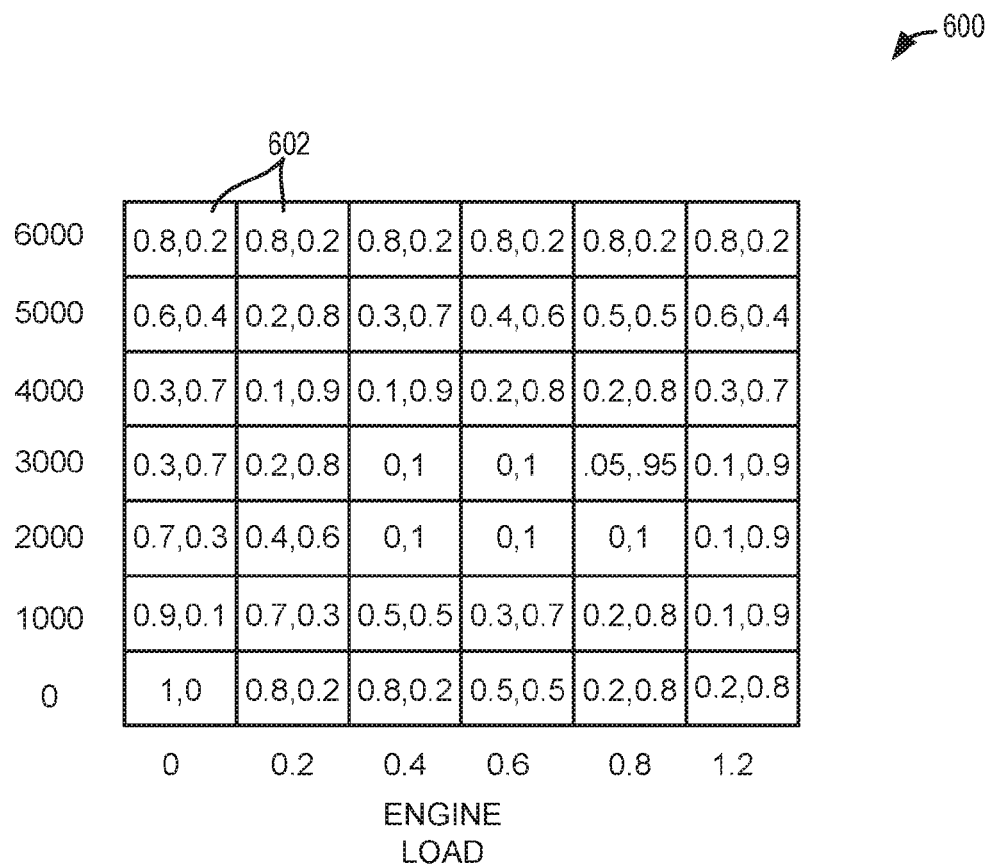
FIG. 6 shows an example table of empirically determined port and direct fuel fractions (DI/PFI split ratio).
Figure 7:
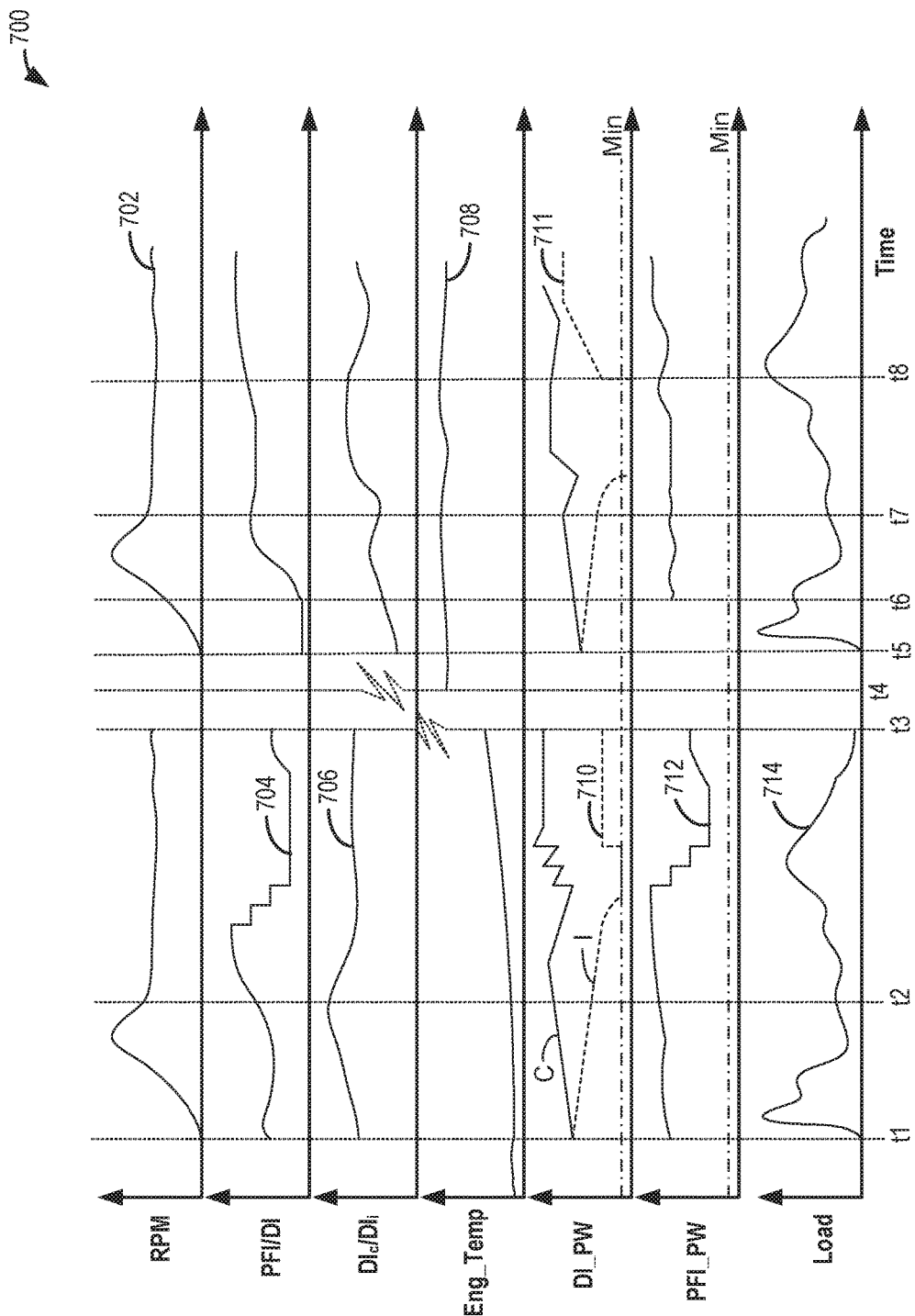
FIG. 7 shows a graphical representation of an example opening and closing of a direct-fuel injector to maintain a minimum fuel injection mass from the direct injector within a range, according to the present disclosure.

With reference to FIG. 6, a table 600 for determining port and direct fuel injector fuel fractions for a total amount of fuel supplied to an engine during an engine cycle is shown. The table of FIG. 6 may be a basis for determining a direct fuel injector fuel fraction as elaborated in the method of FIG. 3. The vertical axis represents engine speed and engine speeds are identified along the vertical axis. The horizontal axis represents engine load and engine load values are identified along the horizontal axis. In this example, table cells 602 include two values separated by a comma. Values to the left sides of the commas represent port fuel injector fuel fractions and values to the right sides of commas represent direct fuel injector fuel fractions. For example, for the table value corresponding to 2000 RPM and 0.2 load holds empirically determined values 0.4 and 0.6. The value of 0.4 or 40% is the port fuel injector fuel fraction, and the value 0.6 or 60% is the direct fuel injector fuel fraction. Consequently, if the desired fuel injection mass is 1 gram of fuel during an engine cycle, 0.4 grams of fuel is port injected fuel and 0.6 grams of fuel is direct injected fuel. In other examples, the table may only contain a single value at each table cell and the corresponding value may be determined by subtracting the value in the table from a value of one. For example, if the 2000 RPM and 0.2 load table cell contains a single value of 0.6 for a direct injector fuel fraction, then the port injector fuel fraction is 1−0.6=0.4.

It may be observed in this example that the port fuel injection fraction is greatest at lower engine speeds and loads. The direct fuel injection fraction is greatest at middle level engine speeds and loads. The port fuel injection fraction increases at higher engine speeds where the time to inject fuel directly to a cylinder may be reduced because of a shortening of time between cylinder combustion events. It may be observed that if engine speed changes without a change in engine load, the port and direct fuel injection fractions may change.

Returning to FIG. 3, at 310, it may be determined if the direct injected fuel is to be delivered as a single injection or multiple injections on a given cylinder cycle. The number of DI injections per cycle may be determined based on conditions such as the engine temperature, the alcohol content of the injected fuel, the engine soot load, as well as the total amount of fuel to be delivered via direct injection in relation to a minimum pulsewidth of the direct injector.

If split DI is desired, at 312, the method includes determining the DI/PFI split ratio (that is, the portion of total fuel delivered as port injection relative to direct injection) as well as the split DI ratio (that is, the portion of the total direct injected fuel delivered in the intake stroke relative to the compression stroke). The split DI may include fuel delivered as multiple direct injections on a given cycle including multiple intake stroke injections, multiple compression stroke injections, or a combination of intake stroke and compression stroke injections. As one example, split DI may be enabled when the fuel alcohol content is higher, or the engine PM load is higher, with the split DI including a larger number of injections per cycle and/or a larger proportion of the direct injected fuel delivered in the compression stroke. As another example, split DI may be enabled as the total amount of fuel to be delivered via direct injection on a given cylinder cycle increases, the number of DI injections increased as the total amount fuel delivered via DI exceeds a minimum amount, the minimum amount based on the minimum pulsewidth of the direct injector.

Thus at 312, the DI fuel amount is being split. In one example, the controller may take the base value (of fuel ratio) determined at 308 (from table 600 of FIG. 6) and modify the base fuel value in a first manner (e.g., based on the total amount of DI). For example, the base value may be modified with a correction factor that is applied to the based DI/PFI ratio determined at 308, and then the DI ratio may be modified based on a DI split ratio that is determined as a function of engine speed/load as well as temperature (engine temperature and catalyst temperature). As a result of the split DI, and split DI/PFI fuel ratios, an amount of the total fuel is delivered as a single port injection and a remaining amount of fuel is delivered as multiple intake and/or compression stroke direct injections. As one example, during an engine cold start, more fuel mass may be required than the DI system alone can provide. This may be due to a limitation of the fuel injector static flow rate or the high pressure fuel pump displacement. In this case, fuel mass is delivered from both systems to meet the total fuel mass requirement. As another example, the DI injector may be needed for catalyst heating or combustion stability. If the total fuel mass request changes, the DI injection is still needed. In this case, the controller may continue with the DI injection even though the total fuel mass may be rich.

At 316, while delivering the fuel as per the scheduled DI/PFI split ratio, fuel injector pulsewidths (for both the DI and PFI injectors) may be monitored and compensated for in the event of minimum pulsewidth violations. Therein, as elaborated with reference to FIG. 4, responsive to one of the multiple direct injections of a cylinder reaching a minimum direct injection pulsewidth, a ratio of port to direct fuel injection may be updated (e.g., reduced) to move injector operation away from the minimum pulsewidth region.

If split DI is not confirmed, at 314, the method includes determining a desired DI/PFI split ratio including an amount of fuel to be delivered as a single port injection and a remaining amount of fuel to be delivered as a single intake or compression stroke direct injection. As such, the split ratio may be determined differently at 314 when split DI is disabled as compared to the split ratio determined at 312 when split DI is enabled. As an example, the split ratio determined when split DI is disabled may have a higher ratio of port injected fuel as compared to direct injected fuel. As another example, the split ratio determined when split DI is enabled may have a higher ratio of direct injected fuel as compared to port injected fuel. As such, two DI injections (including one intake DI injection and one compression DI injection) may have a higher minimum fuel mass than one single injection (intake or compression). So more fuel may be needed in the DI system to honor the minimum fuel masses. At 314, the DI amount is not further split (as is done at 312 and 316). Thus, the base value determined at 308 is applied without the use of an additional correction factor.

At 318, while delivering the fuel as per the scheduled DI/PFI split ratio, fuel injector pulsewidths (for both the DI and PFI injectors) may be monitored and compensated for in the event of minimum pulsewidth violations. Therein, as elaborated with reference to FIG. 5, responsive to any of the port or direct injection of a cylinder reaching a minimum direct injection pulsewidth, a ratio of port to direct fuel injection may be updated such that all the fuel is delivered via direct injection only while disabling port injection of fuel. As elaborated with references to FIGS. 4-5, the compensation for minimum pulsewidth violations may be distinct when split DI is enabled as compared to when split DI is disabled. In doing so, the controller may provide sufficient fuel mass for multiple DI injection pulse widths to meet the minimum pulse width limitation. As such, f a pulse is requested less than the minimum pulse width, the DI fuel injector may not open, or the fuel mass delivered may be very inaccurate.

From each of 316 and 318, the method moves to 320 to actuate the fuel injectors so as to deliver the determined fuel injection amounts with the determined compensations, if any are required. Delivering the fuel with the determined injection amounts and determined compensations may include adjusting the injection timing based on the determined adjustments to the DI/PFI split ratio and the DI split ratio. As an example, a start timing of the port and direct fuel injections may be adjusted (e.g., advanced) as a function of a reduction in the ratio of port to direct fuel injection.

Turning now to FIG. 4, an example method 400 is shown for adjusting a split fuel injection ratio responsive to one of multiple direct injections reaching a minimum direct injection pulsewidth. The method allows for compensating for minimum pulsewidth violations of a fuel injector when split direct injection is enabled. As a result, fuel injection is maintained above the minimum fuel mass of the direct injectors, reducing engine operation and emissions variation.

At 402, the method includes retrieving a determined split fuel injection ratio (including a ratio of fuel split between port injection and direct injection, as well as the ratio of fuel split between an intake stroke direct injection and a compression stroke direct injection). Upon retrieving the ratio, the controller may determine if any of the injections are below the minimum pulsewidth of the corresponding fuel injector (e.g., if the port injection amount is below the minimum pulsewidth of the port fuel injector or if any of the multiple direct injection amounts is below the minimum pulsewidth of the direct fuel injector). If not, at 420, responsive to all fuel injection amounts of the split fuel injection being above the minimum pulsewidth of their corresponding injector, the determined DI/PFI split ratio is maintained. In addition, the intake DI/compression DI split ratio is maintained.

If any of the injections is below the minimum pulsewidth of the corresponding injector, at 404, it may be determined if engine cold-start conditions are present. For example, it may be determined if engine restart conditions are met when the ambient temperature is below a threshold.

Alternatively, it may be determined if the engine restart conditions are confirmed after a threshold duration has elapsed since a last engine shutdown. As such, during engine cold-starts, more fuel mass is required. A single fuel system may not always be able to provide all the requested fuel mass. Additionally, if all the fuel mass is injected from one system, there could be a huge PFI fuel puddle or significant cylinder wall wetting. Therefore, by splitting the injection between the different fuel systems, such issues are averted. As such, during the cold engine restart, the controller may inject, during a single cylinder cycle of the hot restart, a port fuel injection, an intake stroke direct fuel injection, and a compression stroke direct fuel injection. Herein, the amount of fuel injected via PFI relative to DI defines the PFI/DI split ratio, while the amount of fuel injected in the intake stroke relative to the compression stroke defines the DI split ratio. In addition, the port fuel injection is injected from a port fuel injection rail pressurized at least partly by a high pressure direct injection fuel pump.

If an engine cold-start is confirmed, then at 406, it may be determined if one of the multiple direct injections of the cold-start is below the minimum pulsewith (PW) of the direct injector. If not, it may be inferred that the port injection is below the minimum pulsewith (PW) of the port injector. Responsive to the port injection reaching the minimum direct injection pulsewidth, at 409, the method includes disabling port fuel injection and maintaining a ratio of the multiple split direct injections relative to one another, while maintaining an overall fuel injection amount for the cycle. In one example, port fuel injection may be disabled while the pulsewidth of each of the multiple direct injections may be equally increased (based on a signal sent to the fuel injector from the controller) so that the fuel port fuel injection amount is equally distributed between the multiple direct fuel injections. The method then exits.

If it is determined that one of the split direct injections is below the minimum pulsewith (PW) of the direct injector, at 408, it may be further determined if multiple (e.g., two or more or all) of the split direct injections are below the minimum pulsewith (PW) of the direct injector. If not, it may be inferred that only one of the split direct injection amounts is below the minimum fuel injection mass while all remaining direct injections are above the minimum fuel injection mass. Accordingly at 412, responsive to only one of the direct injections reaching the minimum direct injection pulsewidth during the cold-start, the method includes reducing the ratio of port to direct fuel injected fuel (that is, increasing the ratio of DI to PFI fuel) while maintaining a ratio of direct injections relative to one another and while also maintaining an overall fuel injection amount for the cycle. The controller may reduce the PFI:DI ratio (or increase the DI:PFI ratio) by increasing the pulsewidth of the direct injections while correspondingly decreasing the pulsewidth of the port injection based on a signal sent to the fuel injector from the controller. In one example, reducing the ratio of PFI:DI includes transitioning from a ratio of 50% PFI:DI to 25% PFI:DI. Such a change may be required to ensure the DI injection is delivered. The injection timing for the DI may remain unchanged unless the updated pulse width cannot fit. In that case, the timing may be advanced to ensure the updated pulse can fit in the injection window.

Else at 410, responsive to multiple of the direct injections reaching the minimum direct injection pulsewidth, the method includes reducing the ratio of port to direct fuel injection (that is, increasing the ratio of DI to PFI fuel) while adjusting a ratio of the split direct injections to bring an amount of each of the direct injections closer to each other and while maintaining an overall fuel injection amount for the cycle. In one example, reducing the ratio of PFI:DI and adjusting the ratio of the split direct injections includes transitioning from a ratio of 80% Intake:Compression direct injection to 50% Intake:Compression direct injection to reduce the likelihood of the compression injection pulse width being less than the minimum pulse width allowed on the fuel injector. The controller may reduce the PFI:DI ratio (or increase the DI:PFI ratio) and adjust the ratio of the split DI by increasing the pulsewidth of the direct injections while correspondingly decreasing the pulsewidth of the port injection based on a signal sent to the fuel injector from the controller. In one example, the pulsewidth of each of the direct injections may be increased by different amounts based on the relative ratio. For example, the direct injection with the larger ratio of fuel may be increased by a smaller amount while the direct injection with the smaller ratio of fuel may be increased by a larger amount so as to bring the amount of the direct injections closer to each other.

In this way, during a cold engine start, a controller may inject, during a single cylinder cycle, a port fuel injection, an intake stroke direct fuel injection, and a compression stroke direct fuel injection; and responsive to one of the direct injections reaching a minimum direct injection pulsewidth, the controller may reduce a ratio of port to direct fuel injection.

Returning to 404, if cold-start conditions are not confirmed, then a hot engine restart is inferred. As such, during the hot engine restart, the controller may inject, during a single cylinder cycle of the hot restart, a port fuel injection, an intake stroke direct fuel injection, and a compression stroke direct fuel injection. Herein, the amount of fuel injected via PFI relative to DI defines the PFI/DI split ratio, while the amount of fuel injected in the intake stroke relative to the compression stroke defines the DI split ratio. In addition, the port fuel injection is injected from a port fuel injection rail pressurized at least partly by a high pressure direct injection fuel pump.

At 430, it may be determined if one of the multiple direct injections of the hot start is below the minimum pulsewith (PW) of the direct injector. If not, it may be inferred that the port injection is below the minimum pulsewith (PW) of the port injector. Responsive to the port injection reaching the minimum direct injection pulsewidth, at 438, the method includes disabling port fuel injection and maintaining a ratio of the multiple split direct injections relative to one another, while maintaining an overall fuel injection amount for the cycle. In one example, port fuel injection may be disabled while the pulsewidth of each of the multiple direct injections may be equally increased (based on a signal sent to the fuel injector from the controller) so that the fuel port fuel injection amount is equally distributed between the multiple direct fuel injections. The method then exits.

If it is determined that one of the split direct injections of the hot start is below the minimum pulsewith (PW) of the direct injector, at 432, it may be further determined if multiple (e.g., two or more or all) of the split direct injections are below the minimum pulsewith (PW) of the direct injector. If not, it may be inferred that only one of the split direct injection amounts is below the minimum fuel injection mass while all remaining direct injections are above the minimum fuel injection mass. Accordingly at 436, responsive to only one of the hot start direct injections reaching the minimum direct injection pulsewidth, the method includes disabling a smaller of the hot start direct injections while maintaining a ratio of hot start direct injection to port injection fuel amount and while maintaining an overall fuel injection amount for the cycle. In one example, after disabling the smaller of the hot start direct injections, the controller may send a signal to the port and the direct fuel injectors to equally increase the pulsewidth of the port injection and the remaining direct injections, thereby equally distributing the fuel mass contained in the disabled direct injection between the remaining port injection and direct injection. In addition, multiple DI injections may be combined into a single injection if the DI injections are too near (e.g., within a threshold of) the minimum pulse width. For example, the ratio may be transitioned from 40% PFI:DI to 100% DI in order to reduce the likelihood of the DI injection pulse width being too close to the minimum pulse width.

Else at 434, responsive to multiple of the hot start direct injections reaching the minimum direct injection pulsewidth, the method includes disabling one of the hot start direct injections while maintaining a ratio of hot start port injection to direct injection and while maintaining an overall fuel injection amount for the cycle. In one example, the compression stroke direct injection is disabled. Thereafter, the controller may send a signal to the port and the direct fuel injectors to equally increase the pulsewidth of the port injection and the remaining (intake) direct injection to equally distribute the fuel mass contained in the disabled compression stroke direct injection between the remaining port injection and intake stroke direct injection. In addition, multiple DI injections may be combined into a single injection if the DI injections are too near (e.g., within a threshold of) the minimum pulse width. For example, the ratio may be transitioned from 40% PFI:DI to 100% DI in order to reduce the likelihood of the DI injection pulse width being too close to the minimum pulse width.

If after disabling the compression direct injection, the remaining direct injection is still below the minimum pulsewidth, only then the method may further include increasing the ratio of DI to PFI fuel.

In this way, during a hot engine start, a controller may inject, during a single cylinder cycle of the hot restart, a port fuel injection, an intake stroke direct fuel injection, and a compression stroke direct fuel injection; and responsive to one of the hot start direct injections reaching the minimum direct injection pulsewidth, the controller may disable a smaller of the hot start direct injections while maintaining a ratio of hot start direct injection to port injection fuel amount and while maintaining an overall fuel injection amount for the cycle.

It will be appreciated that in situations where the ratio of port to direct fuel injection is reduced, the ratio of port to direct fuel injection is reduced relative to a desired ratio of port to direct fuel injection that is determined based on temperature and a combustion event number counted from the start. It will be further appreciated that a start timing of the port and direct fuel injections may be adjusted as a function of the reduction in the ratio of port to direct fuel injection. As an example, the earlier injections may be retarded more than the later injections. This can improve start time because the more retarded injection timing allows for an earlier first cylinder to be targeted for combustion. Also less fuel mass is required as the engine begins to start, so the ratio of port to direct injection can be changed because one fuel system may be able to provide all the fuel mass required.

Now turning to FIG. 5, an example method 500 is shown for compensating for minimum pulsewidth violations of a fuel injector when split direct injection is not enabled. At 502, the method includes retrieving a determined split fuel injection ratio (including a ratio of fuel split between single port injection and single direct injection). Upon retrieving the ratio, the controller may determine if any of the port and direct injection is below the minimum pulsewidth of the corresponding fuel injector (e.g., if the port injection amount is below the minimum pulsewidth of the port fuel injector or if the direct injection amount is below the minimum pulsewidth of the direct fuel injector). If not, at 504, responsive to all fuel injection amounts of the split fuel injection being above the minimum pulsewidth of their corresponding injector, the determined DI/PFI split ratio is maintained.

If any of the injections is below the minimum pulsewidth of the corresponding injector, at 506, the method includes disabling port injection and injection via direct injection only. For example, the direct injection pulse width may be increased to account for the fuel that would have otherwise been delivered via the port injector. In addition, a timing of the direct injection (e.g., a start timing) may be advanced for the entire fuel pulse width to fit. Further still, if the direct injection amount, upon updating to account for the disabling of the port injection, exceeds a threshold amount, the direct injection may be split into multiple injections. For example, if multiple injections are desired, and the fuel mass is sufficient for multiple injections because the PFI fuel mass was moved to DI, then the direct injection may be split into multiple DI injections.

Turning now to FIG. 7, an example fuel injection adjustment is shown. Map 700 depicts engine speed at plot 702, a PFI/DI split ratio at plot 704, a compression DI to intake DI split ratio (DIc/DIi) at plot 706, engine temperature at plot 708, a direct injection pulsewidth (relative to a minimum pulsewidth) at plots 710-711 (including a compression DI pulsewidth at solid plot 711 and an intake DI pulsewidth at dashed plot 710), a port injection pulsewidth (relative to a minimum pulsewidth) at plot 712, and engine load at plot 714. All plots are depicted over time along the x-axis.

Prior to t1, the engine may be shutdown. The engine temperature may be low at this time. At t1, responsive to an increase in engine load, an engine restart is confirmed. Due to the lower engine temperature at the time of the engine restart, an engine cold start is determined. Responsive to the engine restart condition, the engine may be cranked, and engine fueling and fuel combustion is resumed.

In particular, at t1, based on engine operating conditions including the engine load and the engine temperature, a look-up table is referenced to determine a base DI/PFI split ratio. In the depicted example, the split ratio includes a relatively higher proportion of port injected fuel and a relatively lower proportion of direct injected fuel (e.g., 0.8 PFI and 0.2 DI). In addition, due to the lower engine temperature at the time of the start, the direct injected fuel amount is delivered as a split DI injection with a relatively higher proportion of compression stroke direct injected fuel and a relatively lower proportion of intake stroke direct injected fuel.

Between t1 and t2, as the engine speed and load varies, the PFI/DI ratio is varied, while also varying the split DI ratio. In the present example, as engine speed increases, the ratio of intake stroke direct injected fuel is reduced as the ratio of compression stroke direct injected fuel is proportionally increased.

Between t2 and t3, (only) one of the multiple direct injection pulsewidths (herein the pulsewidth for the intake stroke direct injected fuel) starts to approach the minimum pulsewidth (dashed line Min). To reduce minimum pulsewidth violations, as the DI minimum pulsewidth is approached, the DI/PFI split ratio is increased, as indicated by the step-wise decrease in the port injection pulsewidth and the corresponding increase in the direct injection pulsewidth. At the same time, the DI split ratio is maintained by increasing the compression stroke and intake stroke DI pulsewidths proportionally.

Another engine restart is shown after t4. At t5, an engine restart request is received. Herein due to the higher engine temperature at the time of the engine restart, an engine hot start is determined. Responsive to the engine restart condition, the engine may be cranked, and engine fueling and fuel combustion is resumed. Based on engine operating conditions including the engine load and the engine temperature, a look-up table is referenced to determine a base DI/PFI split ratio. In the depicted example, due to the hot start condition, all the fuel mass is delivered through the DI system to provide the fastest and most robust start time. Thus the PFI system is maintained disabled and the split ratio includes a higher proportion of direct injected fuel. In addition, due to the higher engine temperature at the time of the start, the direct injected fuel amount is delivered as a split DI injection with a relatively higher proportion of compression stroke direct injected fuel and a relatively lower proportion of intake stroke direct injected fuel.

Between t5 and t6, as cranking and initial engine combustion progresses, the proportion of the direct injection fuel mass delivered in the intake stroke is decreased while the compression stroke injected fuel mass is increased, optionally with an increase in the number of compression stroke DI injections.

At t6, once a threshold number of combustion events have elapsed, port injection is enabled and thereafter the PFI/DI ratio is varied based on engine load and engine speed, while continuing to vary the split DI ratio. In the present example, as engine speed increases, the ratio of intake stroke direct injected fuel is reduced as the ratio of compression stroke direct injected fuel is proportionally increased, and as the ratio of port injected fuel is increased.

Between t6 and t7, (only) one of the multiple direct injection pulsewidths (herein the pulsewidth for the intake stroke direct injected fuel) starts to approach the minimum pulsewidth (dashed line Min). At t7, to reduce minimum pulsewidth violations, as the DI minimum pulsewidth is approached, the smaller of the DI injections, herein the intake stroke injection, is disabled while the pulsewidth of the compression stroke DI injection is correspondingly increased while maintaining the DI/PFI split ratio. The number of compression DI injections may also be increased. As such, if multiple of the DI injections started to approach the minimum pulsewidth, then the compression stroke DI injection may have been disabled while increasing the DI/PFI ratio via adjustments (e.g., increase) to the pulsewidth of the intake stroke DI.

At t8, minimum pulsewidth violations may not be an issue anymore due to a change in engine operating conditions. Therefore fueling with split DI usage and split PFI/DI usage is resumed with the DP/PFI and split DI ratios set based on input from a look-up table stored as a function of engine speed and load.

In this way, fuel injection ratios may be controlled to reduce excursions of port and direct injectors below their respective minimum pulsewidths due to changes in engine operating conditions. In particular, fuel injection ratios may be controlled while fuel is being delivered as a split DI/PFI, irrespective of whether the DI fuel is being delivered as a single or a split injection. By reducing the ratio of port to direct fuel injection while adjusting a ratio of direct injections to bring an amount of each of the direct injections closer to each other when multiple of the direct injections reach the minimum direct injection pulsewidth, the effectiveness of the split direct injections during engine starts can be improved while maintaining the overall fuel injection amount for each cycle. In comparison, by reducing the ratio of port to direct fuel injection while maintaining a ratio of direct injections relative to one another when only one of the direct injections reaches the minimum direct injection pulsewidth, the DI split ratio can be maintained while maintaining an overall fuel injection amount for the cycle. In addition, engine emissions can be better managed during a fuel injection transition, particularly when the port fuel injector is coupled to a high pressure port fuel injection rail that is pressurized at least partially via the high pressure fuel pump used also for pressurizing the direct injection fuel rail. By reducing excursions of port and direct fuel injectors to the minimum allowable pulsewidth regions, engine emissions and combustion stability can be improved even as DI/PFI ratios fluctuate responsive to fluctuating engine conditions. Overall engine performance is improved.

One example method comprises: during a cold engine start, injecting, during a single cylinder cycle, a port fuel injection, an intake stroke direct fuel injection, and a compression stroke direct fuel injection; and responsive to one of the direct injections reaching a minimum direct injection pulsewidth, reducing a ratio of port to direct fuel injection. In the preceding example, additionally or optionally, responsive to multiple of the direct injections reaching the minimum direct injection pulsewidth, reducing the ratio of port to direct fuel injection while adjusting a ratio of direct injections to bring an amount of each of the direct injections closer to each other and while maintaining an overall fuel injection amount for the cycle. In any or all of the preceding examples, additionally or optionally, responsive to only one of the direct injections reaching the minimum direct injection pulsewidth, reducing the ratio of port to direct fuel injection while maintaining a ratio of direct injections relative to one another and while maintaining an overall fuel injection amount for the cycle. In any or all of the preceding examples, additionally or optionally, the method further comprises, responsive to the port fuel injection reaching a minimum port fuel injection pulsewidth, disabling port fuel injection and maintaining a ratio of direct injections relative to one another, and while maintaining an overall fuel injection amount for the cycle. In any or all of the preceding examples, additionally or optionally, the method further comprises, during a hot engine restart, injecting, during a single cylinder cycle of the hot restart, a port fuel injection, an intake stroke direct fuel injection, and a compression stroke direct fuel injection; and responsive to one of the hot start direct injections reaching the minimum direct injection pulsewidth, disabling a smaller of the hot start direct injections while maintaining a ratio of hot start direct injection to port injection fuel amount and while maintaining an overall fuel injection amount for the cycle. In any or all of the preceding examples, additionally or optionally, the method further comprises, responsive to the hot start port fuel injection reaching the minimum port fuel injection pulsewidth, disabling port fuel injection and maintaining a ratio of direct injections relative to one another, and while maintaining an overall fuel injection amount for the cycle. In any or all of the preceding examples, additionally or optionally, the method further comprises, responsive to multiple of the hot start direct injections reaching the minimum direct injection pulsewidth, disabling one of the hot start direct injections while maintaining a ratio hot start port injection to direct injection and while maintaining an overall fuel injection amount for the cycle. In any or all of the preceding examples, additionally or optionally, the ratio of port to direct fuel injection is reduced relative to a desired ratio of port to direct fuel injection that is determined based on temperature and a combustion event number counted from the start. In any or all of the preceding examples, additionally or optionally, the port fuel injection is injected from a port fuel injection rail pressurized at least partly by a high pressure direct injection fuel pump. In any or all of the preceding examples, additionally or optionally, a start timing of the port and direct fuel injections is adjusted as a function of the reduction in the ratio of port to direct fuel injection.

Another example method comprises: during a start, injecting, during a single cylinder cycle, a port fuel injection, an intake stroke direct fuel injection, and a compression stroke direct fuel injection; responsive to cold start conditions and one of the direct injections reaching a minimum direct injection pulsewidth, reducing a ratio of port to direct fuel injection; and responsive to hot restart conditions and one of the direct injections reaching the minimum direct injection pulsewidth, disabling a smaller of the direct injections while maintaining a ratio of direct injection to port injection. In the preceding example, additionally or optionally, responsive to cold start conditions and multiple of the direct injections reaching the minimum direct injection pulsewidth, reducing the ratio of port to direct fuel injection while adjusting a ratio of direct injections to bring an amount of each of the direct injections closer to each other and while maintaining an overall fuel injection amount for the cycle. In any or all of the preceding examples, additionally or optionally, responsive to cold start conditions and only one of the direct injections reaching the minimum direct injection pulsewidth, reducing the ratio of port to direct fuel injection while maintaining a ratio of direct injections relative to one another. In any or all of the preceding examples, additionally or optionally, responsive to cold start conditions and the port fuel injection reaching a minimum port fuel injection pulsewidth, disabling port fuel injection and maintaining a ratio of direct injections relative to one another. In any or all of the preceding examples, additionally or optionally, the method further comprises, responsive to hot start condition and the port fuel injection reaching the minimum port fuel injection pulsewidth, disabling port fuel injection and maintaining a ratio of direct injections relative to one another. In any or all of the preceding examples, additionally or optionally, the method further comprises, responsive to hot start condition and multiple of the direct injections reaching the minimum direct injection pulsewidth, disabling one of the direct injections while maintaining a ratio of port injection to direct injection. In any or all of the preceding examples, additionally or optionally, the port fuel injection is injected from a port fuel injection rail pressurized at least partly by a high pressure direct injection fuel pump. In any or all of the preceding examples, additionally or optionally, a start timing of the port and direct fuel injections is adjusted as a function of reduction in the ratio of port to direct fuel injection. In any or all of the preceding examples, additionally or optionally, the method further comprises, responsive to warmed-up engine running conditions after the start, determining a ratio of port to direct fuel injection as a function of speed load, the engine being a boosted engine compressing intake air with a turbine-driven compressor.

Another example system comprises: an engine having a cylinder; a port fuel injector mounted in a port of the cylinder; a direct fuel injector mounted directly into the cylinder; a temperature sensor for sensing engine temperature; and a controller having instructions stored in memory that when executed cause, during a start, the injector to inject, during a single cylinder cycle, a port fuel injection, an intake stroke direct fuel injection, and a compression stroke direct fuel injection; and responsive to one of the direct injections reaching a minimum direct injection pulsewidth, adjusting a ratio of port to direct fuel injection.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
    during an engine cold-start,
        injecting a fuel during a single cylinder cycle as a port fuel injection from a port injector, and each of an intake stroke direct fuel injection and a compression stroke direct fuel injection from a direct injector; and
        responsive to one of the direct injections reaching a minimum direct injection pulsewidth of the direct injector, reducing a ratio of port fuel injection over direct fuel injection while maintaining an overall fuel injection amount for the cycle.

2. The method of claim 1, wherein the reducing includes, responsive to multiple of the direct injections reaching the minimum direct injection pulsewidth, reducing the ratio of port fuel injection over direct fuel injection while adjusting a ratio of the direct injections to bring an amount of each of the direct injections closer to each other and while maintaining the overall fuel injection amount for the cycle.

3. The method of claim 1, wherein the reducing includes, responsive to only one of the direct injections reaching the minimum direct injection pulsewidth, reducing the ratio of port fuel injection over direct fuel injection while maintaining a ratio of the direct injections relative to one another and while maintaining the overall fuel injection amount for the cycle.

4. The method of claim 1, further comprising, responsive to the port fuel injection reaching a minimum port fuel injection pulsewidth of the port injector, disabling the port fuel injection and maintaining a ratio of the direct injections relative to one another and while maintaining the overall fuel injection amount for the cycle.

5. The method of claim 1, further comprising, during a hot engine restart, injecting fuel, during a single cylinder cycle of the hot start, as a port fuel injection, an intake stroke direct fuel injection, and a compression stroke direct fuel injection; and, responsive to one of the hot start direct injections reaching the minimum direct injection pulsewidth, disabling a smaller of the hot start direct injections while maintaining a ratio of hot start direct injection fuel amount to port injection fuel amount and while maintaining an overall fuel injection amount for the cycle.

6. The method of claim 5, further comprising, responsive to the hot start port fuel injection reaching a minimum port fuel injection pulsewidth of the port injector, disabling port fuel injection while maintaining a ratio of the direct injections relative to one another, and while maintaining the overall fuel injection amount for the cycle.

7. The method of claim 5, further comprising, responsive to multiple of the hot start direct injections reaching the minimum direct injection pulsewidth, disabling one of the hot start direct injections while maintaining a ratio of the hot start port injection over direct injection and while maintaining the overall fuel injection amount for the cycle.

8. The method of claim 1, wherein the ratio of port fuel injection over direct fuel injection is reduced relative to a desired ratio of port fuel injection to direct fuel injection that is determined based on temperature and a combustion event number counted from the engine cold-start.

9. The method of claim 1, wherein the port fuel injection is injected from a port fuel injector coupled to a port fuel injection rail pressurized at least partly by a high pressure direct injection fuel pump.

10. The method of claim 1, wherein a start timing of the port and direct fuel injections is adjusted as a function of the reduction in the ratio of port fuel injection over direct fuel injection.

11. A method for an engine, comprising:
injecting fuel during a single cylinder cycle of an engine start as each of a port fuel injection from a port fuel injector, and an intake stroke direct fuel injection and a compression stroke direct fuel injection from a direct fuel injector;
responsive to the engine start being a cold-start and one of the direct injections of the cold-start reaching a minimum direct injection pulsewidth of the direct injector, reducing a ratio of port fuel injection over direct fuel injection; and
responsive to the engine start being a hot-start and one of the direct injections reaching the minimum direct injection pulsewidth of the direct injector, disabling a smaller of the direct injections while maintaining the ratio of port fuel injection over direct fuel injection.

12. The method of claim 11, wherein, responsive to multiple of the direct injections of the cold-start reaching the minimum direct injection pulsewidth, reducing the ratio of port fuel injection over direct fuel injection while adjusting a ratio of the direct injections relative to one another to bring an amount of each of the direct injections closer to each other and while maintaining an overall fuel injection amount for the cycle.

13. The method of claim 12, wherein, responsive to only one of the direct injections of the cold-start reaching the minimum direct injection pulsewidth, reducing the ratio of port fuel injection over direct fuel injection while maintaining the ratio of the direct injections relative to one another.

14. The method of claim 13, wherein, responsive to the port fuel injection of the cold-start reaching a minimum port fuel injection pulsewidth of the port fuel injector, disabling the port fuel injection and maintaining the ratio of the direct injections relative to one another.

15. The method of claim 14, further comprising, responsive to the hot-start and the port fuel injection reaching the minimum port fuel injection pulsewidth, disabling port fuel injection and maintaining the ratio of the direct injections relative to one another.

16. The method of claim 15, further comprising, responsive to the hot-start and multiple of the direct injections reaching the minimum direct injection pulsewidth, disabling one of the direct injections while maintaining the ratio of port fuel injection over direct fuel injection.

17. The method of claim 16, wherein the port fuel injection is injected from a port fuel injection rail pressurized at least partly by a high pressure direct injection fuel pump.

18. The method of claim 11, wherein a start timing of the port and direct fuel injections is adjusted as a function of reduction in the ratio of port fuel injection over direct fuel injection.

19. The method of claim 11, further comprising, responsive to warmed-up engine running conditions after engine starting, determining the ratio of port fuel injection over direct fuel injection as a function of speed and load, the engine being a boosted engine compressing intake air with a turbine-driven compressor.

20. An engine system, comprising:
an engine having a cylinders;
a port fuel injector mounted in a port of the cylinder;
a direct fuel injector mounted directly into the cylinder;
a temperature sensor for sensing engine temperature; and
a controller having instructions stored in memory that when executed cause:
during a single cylinder cycle of an engine cold-start, the port fuel injector to inject a port fuel injection, and the direct fuel injector to inject an intake stroke direct fuel injection and a compression stroke direct fuel injection; and
responsive to one of the intake stroke direct fuel injection and compression stroke direct fuel injection reaching a minimum direct injection pulsewidth of the direct fuel injector, adjust a ratio of port fuel injection over direct fuel injection.

\* \* \* \* \*